(12) United States Patent
Yu et al.

(10) Patent No.: US 11,609,403 B2
(45) Date of Patent: Mar. 21, 2023

(54) OPTICAL MODULE

(71) Applicants: Sintai Optical (Shenzhen) Co., Ltd., ShenZhen (CN); Asia Optical Co., Inc., Taichung (TW)

(72) Inventors: Chaeg-Ran Yu, Taichung (TW); Chiao-Sen Hsu, Taichung (TW); Keng-Hui Lin, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 428 days.

(21) Appl. No.: 16/789,485

(22) Filed: Feb. 13, 2020

(65) Prior Publication Data

US 2020/0310075 A1    Oct. 1, 2020

(30) Foreign Application Priority Data

Mar. 25, 2019    (CN) .......................... 201910227105.3

(51) Int. Cl.
*G02B 7/00* (2021.01)
*G02B 7/02* (2021.01)
*G02B 9/04* (2006.01)

(52) U.S. Cl.
CPC ............. *G02B 7/023* (2013.01); *G02B 7/025* (2013.01); *G02B 9/04* (2013.01)

(58) Field of Classification Search
CPC .......... G02B 9/04; G02B 7/025; G02B 7/023; G02B 7/022; G02B 7/00; G02B 7/02
USPC ....................................................... 359/823
See application file for complete search history.

(56) References Cited

U.S. PATENT DOCUMENTS

| 5,376,988 A * | 12/1994 | Osanai | ................... F16C 29/025 |
| | | | 355/75 |
| 8,345,361 B2 | 1/2013 | Lin et al. | |
| 2002/0005997 A1 | 1/2002 | Oba | |
| 2012/0154936 A1* | 6/2012 | Park | ....................... G02B 7/023 |
| | | | 359/822 |
| 2017/0299947 A1* | 10/2017 | Nakamura | ............... G02B 7/02 |

(Continued)

FOREIGN PATENT DOCUMENTS

| CN | 1333473 A | 1/2002 |
| CN | 103343899 A | 10/2013 |
| CN | 108873327 A | 11/2018 |

(Continued)

*Primary Examiner* — William R Alexander
(74) *Attorney, Agent, or Firm* — McClure, Qualey & Rodack, LLP

(57) ABSTRACT

An optical module includes a first bearer and a second bearer. The first bearer includes a first bearing portion and an inclined plane, the first bearing portion is configured to carry a first optical element, and the inclined plane is disposed on a peripheral edge of a first end surface of the first bearing portion. The second bearer includes a second bearing portion and a protruding portion, the second bearing portion is configured to carry a second optical element, a second end surface of the second bearing portion faces the first end surface, and the protruding portion extends from the second end surface to the first bearing portion and is configured to contact the inclined plane. When the protruding portion contacts the inclined plane, the inclined plane does not expose the protruding portion in a direction from the first bearing portion to the second bearing portion.

19 Claims, 5 Drawing Sheets

(56) References Cited

U.S. PATENT DOCUMENTS

2017/0307841 A1* 10/2017 Nakamura ............. G03B 43/00
2018/0307003 A1* 10/2018 Shibasaki ................ G02B 7/04

FOREIGN PATENT DOCUMENTS

| | | |
|---|---|---|
| CN | 208044168 U | 11/2018 |
| JP | 2015126215 A | 7/2015 |
| TW | 201118498 A | 6/2011 |
| TW | I417633 B | 12/2013 |

* cited by examiner

OPTICAL MODULE

BACKGROUND OF THE INVENTION

Field of the Invention

The invention relates to an optical module, and more particularly to an optical module, the assembly of which is simplified.

Description of the Related Art

A typical optical module includes a light source and a lens. To meet the optical design, adjusting a position of the light source with respect to the lens (or a position of the lens with respect to the light source) during assembly of the optical module is required. Therefore, a bearer for carrying the lens is generally provided with a plurality of screws corresponding to adjusting directions (e.g. X, Y and Z-directions). The user can move the bearer by rotating the screws so as to adjust the position of the light source with respect to the lens.

However, the assembly of the optical module described above is cumbersome and can be only applied to the optical module that has low requirement on fineness of adjustment. For the optical module that has high requirement on fineness of adjustment, an adjusting mechanism (e.g. gear box) is provided. The adjusting mechanism has complicated design so that the components in the optical module can be accurately adjusted, but cost of the optical module is also increased.

BRIEF SUMMARY OF THE INVENTION

The invention provides an optical module including two improved bearers for carrying the light source and the lens respectively. By such arrangement, the position of the light source with respect to the lens (or the position of the lens with respect to the light source) can be adjusted by simple rotational operation, and the adjustment with high fineness is accomplished. In other words, the optical module is not required to use the adjusting mechanism that has complicated design to experience the adjustment with high fineness. Therefore, the assembly is simplified, and the cost is decreased.

The optical module in accordance with an embodiment of the invention includes a first bearer and a second bearer. The first bearer includes a first bearing portion and an inclined plane, wherein the first bearing portion is configured to carry a first optical element, and the inclined plane is disposed on a peripheral edge of a first end surface of the first bearing portion. The second bearer includes a second bearing portion and a protruding portion, wherein the second bearing portion is configured to carry a second optical element, a second end surface of the second bearing portion faces the first end surface of the first bearing portion, and the protruding portion extends from the second end surface of the second bearing portion to the first bearing portion and is configured to contact the inclined plane. When the protruding portion contacts the inclined plane, the inclined plane does not expose the protruding portion in a direction from the first bearing portion to the second bearing portion. During assembly of the optical module, the protruding portion is placed against the inclined plane, and the first bearer and the second bearer are moved with respect to each other on a vertical plane.

In another embodiment, during assembly of the optical module, the protruding portion and the inclined plane are moved with respect to each other by rotating and moving the first bearer and the second bearer with respect to each other on the vertical plane, so as to direct the first optical element and the second optical element at each other as well as adjust a distance between the first optical element and the second optical element for constituting an optical axis. The optical axis vertically passes through the vertical plane.

In yet another embodiment, after the distance between the first optical element and the second optical element is adjusted, no portion of the second bearer contacts the first bearer except the protruding portion.

In another embodiment, the inclined plane is sloped along the peripheral edge of the first end surface, the first end surface of the first bearing portion has a first opening, the first opening exposes the first optical element, and the peripheral edge of the first end surface surrounds the first opening. The second end surface of the second bearing portion has a second opening, the second opening exposes the second optical element, and the protruding portion is disposed on any of areas of the second end surface except the second opening.

In yet another embodiment, one of the first bearing portion and the second bearing portion has a third end surface, the third end surface is opposite to the first end surface or the second end surface and has a third opening, and the third opening exposes the first optical element or the second optical element.

In another embodiment, one of the first optical element and the second optical element is a light source, the other one of the first optical element and the second optical element is a lens, the light source is configured to emit a light beam, and the lens is configured to allow the light beam to pass through.

In yet another embodiment, when the protruding portion contacts the inclined plane, the first optical element and the second optical element constitutes an optical axis, after the optical axis is constituted, the first bearer and the second bearer are fixed to each other by putting glue between the first bearer and the second bearer.

In another embodiment, the first bearer further includes another inclined plane, and the inclined planes are separately disposed on the peripheral edge of the first end surface of the first bearing portion. The second bearer further includes another protruding portion, the protruding portions are spaced and correspond to the inclined planes, and each protruding portion extends from the second end surface of the second bearing portion and is configured to contact the corresponding inclined plane. When one of the protruding portions contacts the corresponding inclined plane, the inclined plane does not expose the protruding portion in the direction from the first bearing portion to the second bearing portion.

In yet another embodiment, the optical module further includes an optical modulating unit and an optical guiding unit. The optical modulating unit is configured to receive the light beam from the lens and add image information to the light beam for produce an image light beam. The optical guiding unit is configured to guide the image light beam to human eye, wherein the optical modulating unit is disposed between the optical guiding unit and the first bearer or the second bearer which is configured to carry the lens.

In another embodiment, one of the first optical element and the second optical element is a light source, the other one of the first optical element and the second optical element is a lens, the light source is configured to emit a light beam, and the lens is configured to allow the light beam to pass through.

In yet another embodiment, when the protruding portion contacts the inclined plane, the first optical element and the second optical element constitutes an optical axis.

In another embodiment, the optical module further includes an optical modulating unit and an optical guiding unit. The optical modulating unit is configured to receive the light beam from the lens and add image information to the light beam for produce an image light beam. The optical guiding unit is configured to guide the image light beam to human eye, wherein the optical modulating unit is disposed between the optical guiding unit and the first bearer or the second bearer which is configured to carry the lens.

In yet another embodiment, the first bearer further includes another inclined plane, and the inclined planes are separately disposed on the peripheral edge of the first end surface of the first bearing portion. The second bearer further includes another protruding portion, the protruding portions are spaced and correspond to the inclined planes, and each protruding portion extends from the second end surface of the second bearing portion and is configured to contact the corresponding inclined plane. When one of the protruding portions contacts the corresponding inclined plane, the inclined plane does not expose the protruding portion in the direction from the first bearing portion to the second bearing portion.

In another embodiment, when the protruding portion contacts the inclined plane, the first optical element and the second optical element constitutes the optical axis, after the optical axis is constituted, the first bearer and the second bearer are fixed to each other by putting glue between the first bearer and the second bearer.

In yet another embodiment, after the distance between the first optical element and the second optical element is adjusted, no portion of the second bearer contacts the first bearer except the protruding portion.

In another embodiment, one of the first optical element and the second optical element is a light source, the other one of the first optical element and the second optical element is a lens, the light source is configured to emit a light beam, and the lens is configured to allow the light beam to pass through.

In yet another embodiment, when the protruding portion contacts the inclined plane, the first optical element and the second optical element constitutes an optical axis, after the optical axis is constituted, the first bearer and the second bearer are fixed to each other by putting glue between the first bearer and the second bearer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
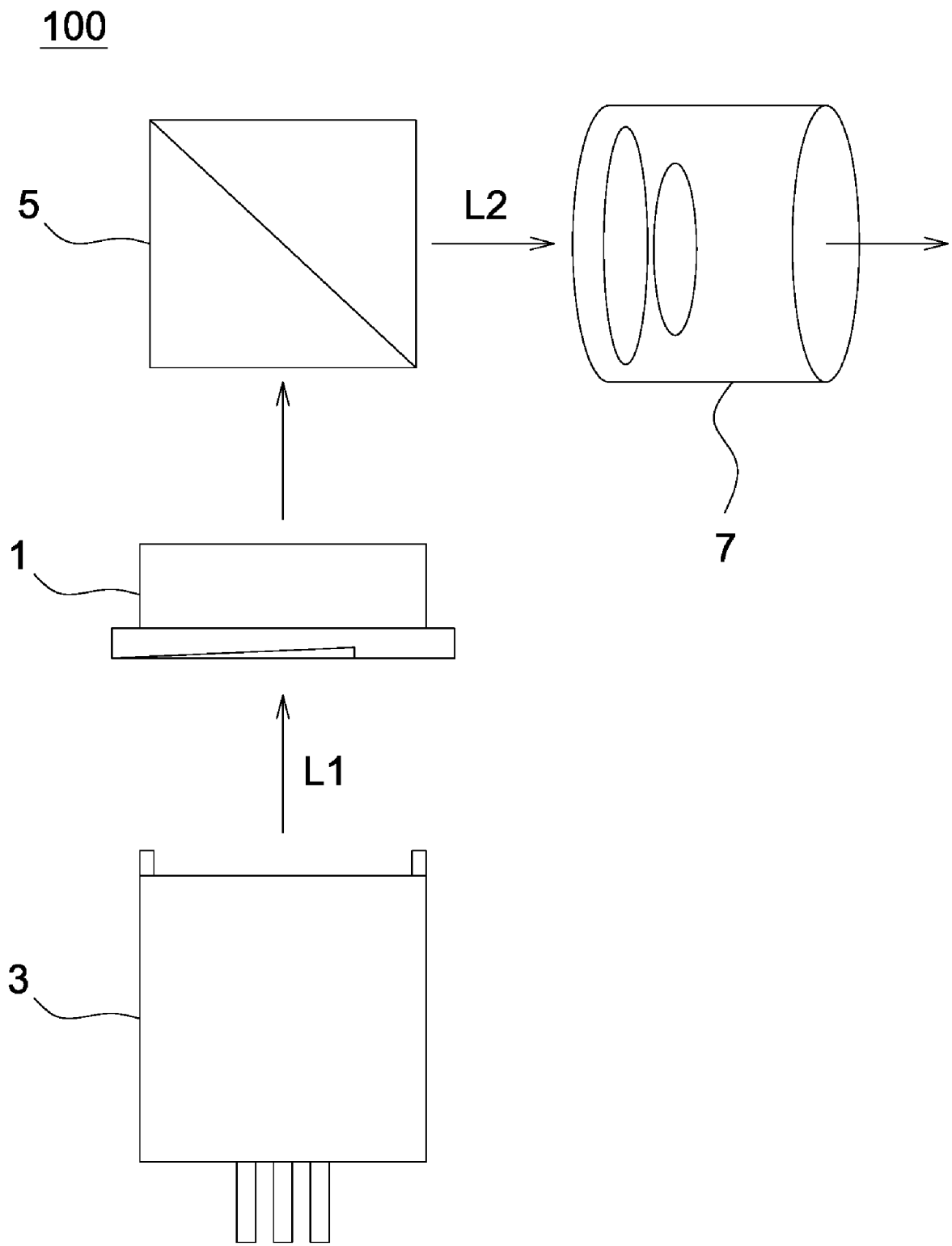
FIG. 1 is a schematic view of an optical module in accordance with an embodiment of the invention.

Referring to FIG. 1, an optical module 100 in accordance with an embodiment of the invention includes a lens module 1, a light source module 3, an optical modulating unit 5 and an imaging lens 7, wherein the light source module 3 is configured to emit a light beam L1, the light beam L1 passes through the lens module 1 and is transformed to an image light beam L2, and the image light beam L2 is projected by the imaging lens 7.

Figure 2:
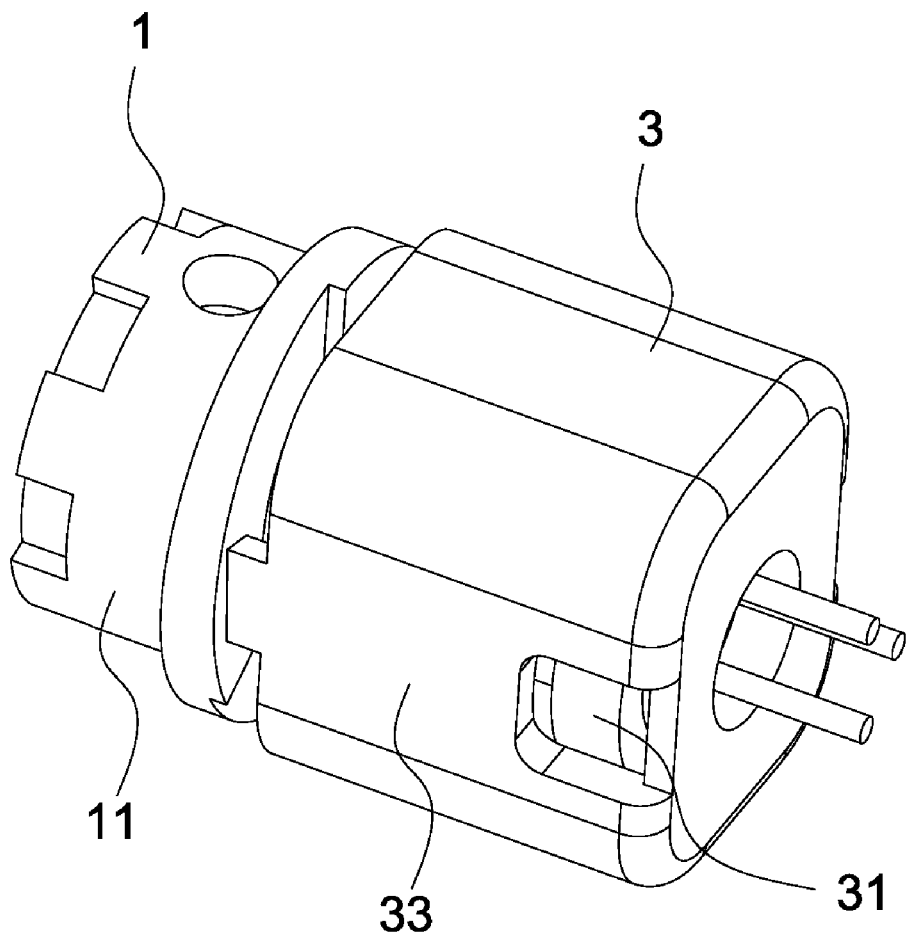
FIG. 2 is a schematic view of a lens module and a light source module of FIG. 1.
Figure 3:
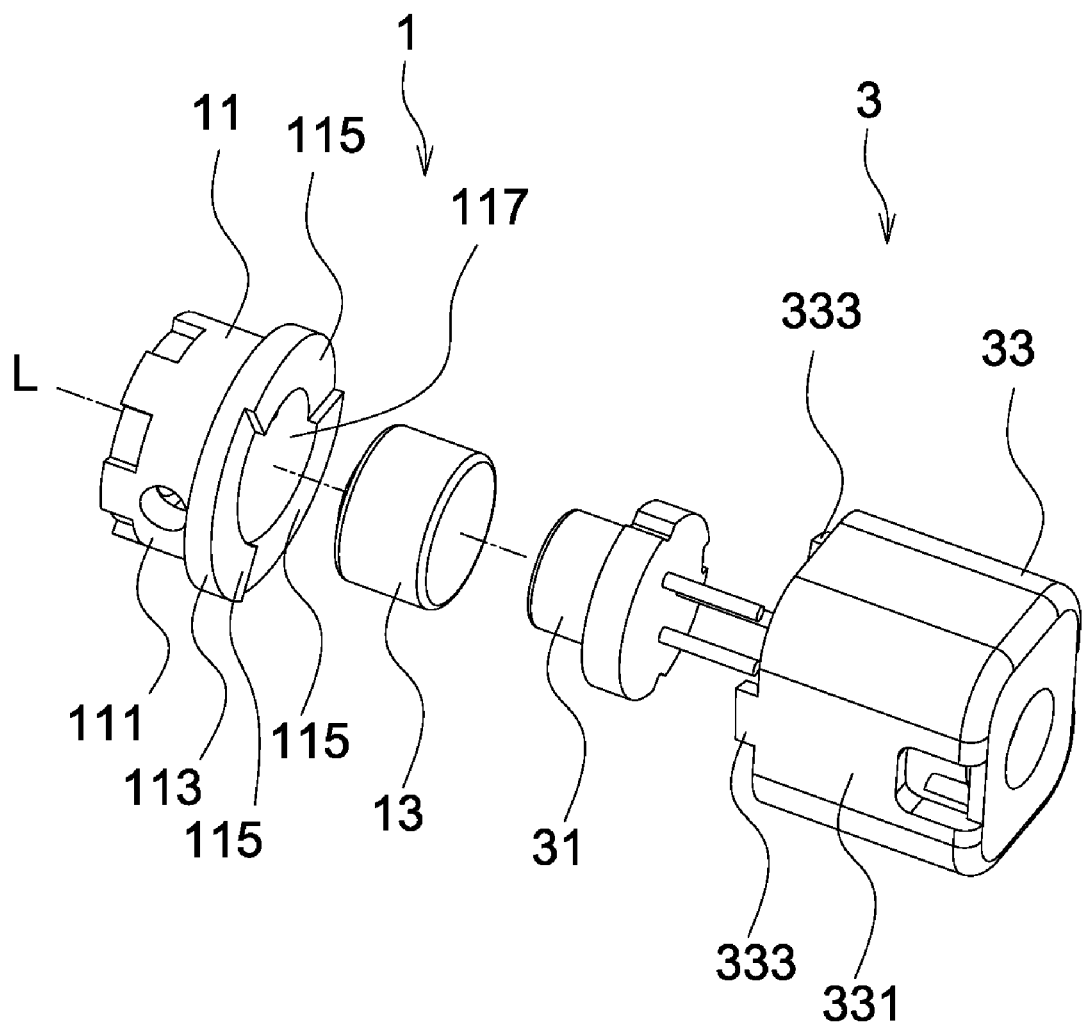
FIG. 3 is an exploded schematic view of the lens module and the light source module of FIG. 2.

Referring to FIGS. 2 and 3, the lens module 1 includes a lens bearer 11 and a lens 13, and the lens bearer 11 includes a first bearing portion 111, a flange portion 113 and a plurality of inclined planes 115. In the present embodiment, the first bearing portion 111 is substantially a hollow cylindrical body and is configured to carry the lens 13. The flange portion 113 extends from an end portion of the first bearing portion 111 near the light source module 3 in a radial direction of the first bearing portion 111. Also, a peripheral edge of a first end surface on the flange portion 113 that faces the light source module 3 is provided with the inclined planes 115. Each of the inclined planes 115 is bent in a circumferential direction of the first bearing portion 111, so that the inclined planes 115 constitute a ring. If the inclined planes 115 are observed in the radial direction of the first bearing portion 111, it is found that each of the inclined planes 115 has a highest point and a lowest point. In other words, each of the inclined planes 115 is sloped along the peripheral edge of the first end surface.

As shown in FIG. 3, the light source module 3 includes a light source 31 and a light source bearer 33, and the light source bearer 33 includes a second bearing portion 331 and a plurality of protruding portions 333. In the present embodiment, the second bearing portion 331 is substantially a hollow rectangular body and is configured to carry the light source 31. The protruding portions 333 extend from a second end surface of the second bearing portion 331 to the lens module 1 and are configured to contact the inclined planes 115. The second end surface of the second bearing portion 331 faces the first end surface of the lens module 1. It is worth noting that the protruding portions 333 are disposed correspondingly to the inclined planes 115, a plurality of intervals is formed between the protruding portions 333, and each of the intervals is between two adjacent protruding portions 333.

The first end surface has a first opening 117, the peripheral edge of the first end surface surrounds the first opening 117, and the first opening 117 is configured to expose the lens 13. The second end surface has a second opening (not shown, because of the view angle of FIG. 3), and the second opening is configured to expose the light source 31. The protruding portions 333 are disposed on any of areas of the second end surface except the second opening. The first bearing portion 111 further has a third end surface, and the third end surface is opposite to the first end surface, has a third opening (not shown, because of the view angle of FIG. 3) and is configured to expose the lens 13. Therefore, the light beam L1 emitted by the light source module 3 can pass through the lens 13 by the first opening 117 and the third opening.

In the present embodiment, the light source 31 is a laser diode (LD), the lens 13 is a collimating lens, and the optical modulating unit is a digital micromirror device (DMD).

Figure 4:
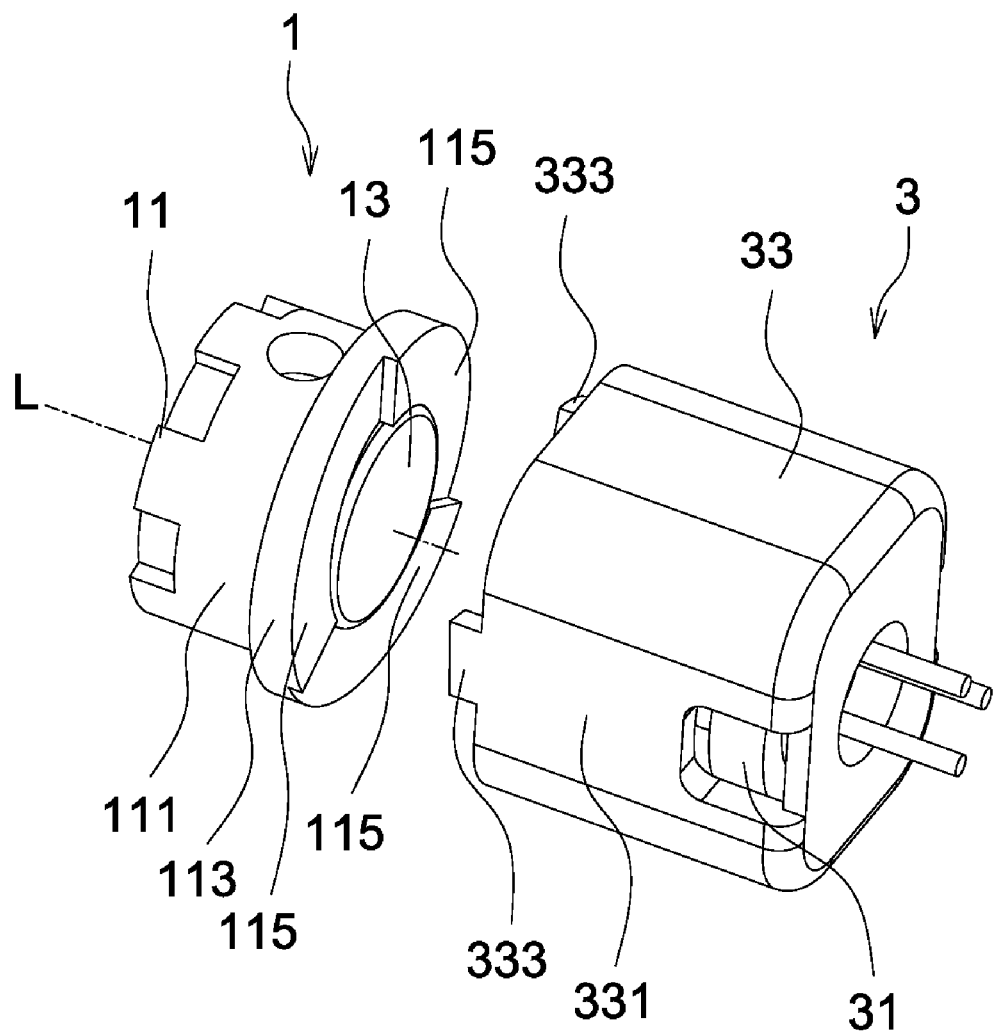
FIG. 4 is a schematic view of the lens module and the light source module of FIG. 2 during an assembly.

Referring to FIG. 4, during assembly, the lens 13 is fixed on the first bearing portion 111 of the lens bearer 11, and the light source 31 is fixed on the second bearing portion 331 of the light source bearer 33 for following position adjustment. The light source module 3 is moved with respect to the lens module 1 on a vertical plane (that is, a plane constituted by a x-direction and a y-direction of FIG. 4), so that a center of the light source 31 is directed at a center of the lens 13. After the light source 31 and the lens 13 are directed at each other, the light source module 31 is moved with respect to the lens module 1 in a direction (that is, a z-direction of FIG. 4) perpendicular to the vertical plane, so that the protruding portions 222 are placed against the inclined planes 115. When the protruding portions 222 contact the inclined planes 115, the lens 13 and the light source 31 constitute an optical axis L vertically passing through the vertical plane. The inclined planes 115 do not expose the protruding portions 333 in the −z-direction (that is, a direction from the first bearing portion 111 to the second bearing portion 331). The light source module 3 is then rotated with respect to the lens module 1. Meanwhile, each of the protruding portions 333 is moved between the highest point and the lowest point of each of the inclined planes 115, so that the light source module 3 is slightly moved with respect to the lens module 1 in a direction parallel to the optical axis L. Therefore, the position of the light source 31 with respect to the lens 13 (or the position of the lens 13 with respect to the light source 31) is adjusted. It is understood that if the protruding portion 333 is moved towards the lowest point of the inclined plane 115, the distance between the light source 31 and the lens 13 is shortened. Also, if the protruding portion 333 is moved towards the highest point of the inclined plane 115, the distance between the light source 31 and the lens 13 is lengthened. When the light source 31 is adjusted to be spaced from the lens 13 at a predetermined distance, glue is putted in the space between the inclined planes 115 and the intervals formed between the protruding portions 333 and firmly sticks the light source module 3 and the lens module 1 together, so as to accomplish the assembly of the optical module 100. It is worth noting that since the inclined planes 115 contact the protruding portions 333, a condition of applying glue between the lens bearer 11 and the light source bearer 33 without support can be avoided and therefore strength, reliability of assembly and precision can be improved. It is also worth noting that, no portion of the light source module 3 contacts the lens module 1 except the protruding portions 333.

Although the above description of the adjustment is based on rotating the light source module 3, the light source 31 can be spaced from the lens 13 at the predetermined distance by rotating the lens module 1. In other words, the light source module 3 and the lens module 1 can be moved with respect to each other in the direction parallel to the optical axis L by rotating the light source module 3 or the lens module 1.

By way of the inclined planes 115, the rotation of the light source module 3 or the lens module 1 is transformed into a small-scale rectilinear motion in the desired direction of adjustment. In other words, only a simple rotational operation on an adjusting mechanism (not shown) for adjusting the optical module 100 is required, and the optical module 100 can experience an adjustment with high fineness. The design of the inclined planes 115 can be modified according to the requirement of the fineness of adjustment, and there is no need to redesign the adjusting mechanism or change the manner of adjustment for change the fineness of adjustment. Comparing to the conventional optical module provided with the adjusting mechanism that has complicated design, the optical module 100 of the invention is provided with decreased volume as well as fewer elements, is less costly, and is assembled in a simpler way, and the corresponding adjusting mechanism has a simpler design and improved fineness of adjustment.

During operation, the light source 31 emits a light beam L1, and the light beam L1 is collimated through the lens 13 and enters the optical modulating unit 5. The optical modulating unit 5 adds image information (not shown) to the light beam L1 for producing an image light beam L2.

In another embodiment, the flange portion 113 is provided with only one inclined plane (not shown), and the inclined plane is sloped and extends along the circumference of the first bearing portion 111 for constituting a ring. Comparing to a plurality of inclined planes, design of single inclined plane provides a broadened range of adjustment in the direction parallel to the optical axis L. The arrangement of other elements and operation of this embodiment are similar to those of the embodiment described above, and therefore the descriptions thereof are omitted.

In yet another embodiment, a plurality of inclined planes (not shown) are disposed on a second end surface of the second bearing portion 331 that faces the lens module 1, and a plurality of protruding portions (not shown) extend from an first end surface of the first bearing portion 111 that faces the light source module 3 in the direction parallel to the optical axis L for contacting the inclined planes. The arrangement of other elements and operation of this embodiment are similar to those of the embodiment described above, and therefore the descriptions thereof are omitted.

Figure 5:
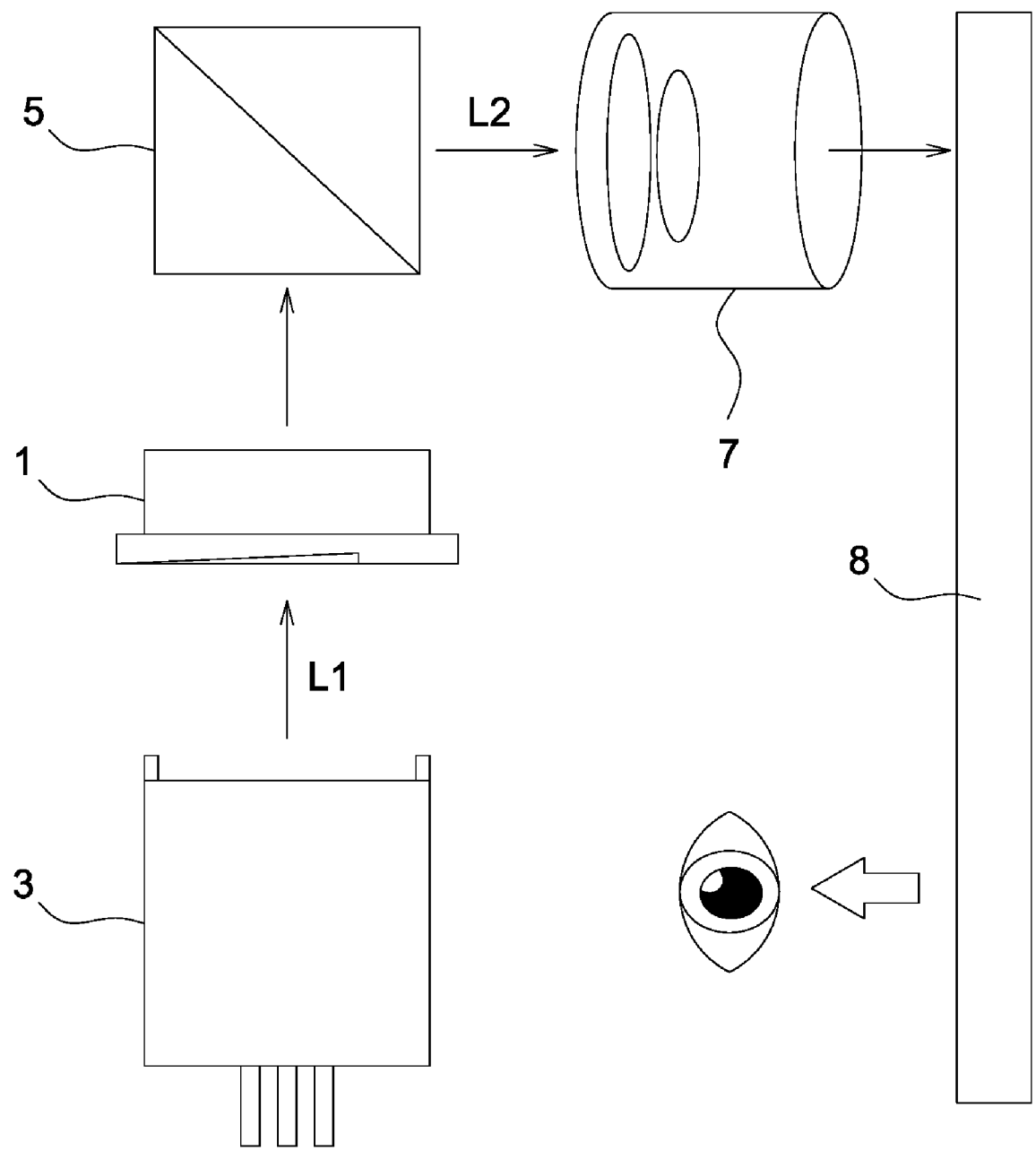
FIG. 5 is a schematic view of an optical module in accordance with another embodiment of the invention.

Referring to FIG. 5, FIG. 5 depicts an optical module 200 in accordance with another embodiment of the invention. The difference between the optical module 200 and the optical module 100 of FIG. 1 is that the optical module 200 further includes an optical guiding unit 8. During operation, the light source 31 emits a light beam L1, and the light beam L1 is collimated through the lens 13 and enters the optical modulating unit 5. The optical modulating unit 5 adds image information (not shown) to the light beam L1 for producing an image light beam L2. The image light beam L2 passes through the imaging lens 7, enters the optical guiding unit 8 and is guided to human eye by the optical guiding unit 8 for user's observation.

What is claimed is:
1. An optical module, comprising:
  a first bearer comprising a first bearing portion and an inclined plane, wherein the first bearing portion is configured to carry a first optical element, and the inclined plane is disposed on a peripheral edge of a first end surface of the first bearing portion; and
  a second bearer comprising a second bearing portion and a protruding portion, wherein the second bearing portion is configured to carry a second optical element, a second end surface of the second bearing portion faces the first end surface of the first bearing portion, and the protruding portion extends from the second end surface of the second bearing portion to the first bearing portion and is configured to contact the inclined plane;
  wherein when the protruding portion contacts the inclined plane, the inclined plane does not expose the protruding portion in a direction from the first bearing portion to the second bearing portion;
  wherein during assembly of the optical module, the protruding portion is placed against the inclined plane, and the first bearer and the second bearer are moved with respect to each other on a vertical plane;

wherein when the protruding portion contacts the inclined plane, the first optical element and the second optical element constitutes an optical axis, after the optical axis is constituted, the first bearer and the second bearer are fixed to each other.

2. The optical module as claimed in claim 1, wherein during assembly of the optical module, the protruding portion and the inclined plane are moved with respect to each other by rotating and moving the first bearer and the second bearer with respect to each other on the vertical plane, so as to direct the first optical element and the second optical element at each other as well as adjust a distance between the first optical element and the second optical element for constituting an optical axis;
wherein the optical axis vertically passes through the vertical plane.

3. The optical module as claimed in claim 1, wherein after the distance between the first optical element and the second optical element is adjusted, no portion of the second bearer contacts the first bearer except the protruding portion.

4. The optical module as claimed in claim 3, wherein the inclined plane is sloped along the peripheral edge of the first end surface, the first end surface of the first bearing portion has a first opening, the first opening exposes the first optical element, and the peripheral edge of the first end surface surrounds the first opening;
the second end surface of the second bearing portion has a second opening, the second opening exposes the second optical element, and the protruding portion is disposed on any of areas of the second end surface except the second opening.

5. The optical module as claimed in claim 4, wherein one of the first bearing portion and the second bearing portion has a third end surface, the third end surface is opposite to the first end surface or the second end surface and has a third opening, and the third opening exposes the first optical element or the second optical element.

6. The optical module as claimed in claim 3, wherein one of the first optical element and the second optical element is a light source, the other one of the first optical element and the second optical element is a lens, the light source is configured to emit a light beam, and the lens is configured to allow the light beam to pass through.

7. The optical module as claimed in claim 6, wherein when the protruding portion contacts the inclined plane, the first optical element and the second optical element constitutes an optical axis, after the optical axis is constituted, the first bearer and the second bearer are fixed to each other by putting glue between the first bearer and the second bearer.

8. The optical module as claimed in claim 7, wherein the first bearer further comprises another inclined plane, and the inclined planes are separately disposed on the peripheral edge of the first end surface of the first bearing portion;
wherein the second bearer further comprises another protruding portion, the protruding portions are spaced and correspond to the inclined planes, and each protruding portion extends from the second end surface of the second bearing portion and is configured to contact the corresponding inclined plane;
wherein when one of the protruding portions contacts the corresponding inclined plane, the inclined plane does not expose the protruding portion in the direction from the first bearing portion to the second bearing portion.

9. The optical module as claimed in claim 8, further comprising:

an optical modulating unit configured to receive the light beam from the lens and add image information to the light beam for produce an image light beam; and
an optical guiding unit configured to guide the image light beam to human eye, wherein the optical modulating unit is disposed between the optical guiding unit and the first bearer or the second bearer which is configured to carry the lens.

10. The optical module as claimed in claim 2, wherein one of the first optical element and the second optical element is a light source, the other one of the first optical element and the second optical element is a lens, the light source is configured to emit a light beam, and the lens is configured to allow the light beam to pass through.

11. The optical module as claimed in claim 10, wherein when the protruding portion contacts the inclined plane, the first optical element and the second optical element constitutes an optical axis.

12. The optical module as claimed in claim 11, further comprising:
an optical modulating unit configured to receive the light beam from the lens and add image information to the light beam for produce an image light beam; and
an optical guiding unit configured to guide the image light beam to human eye, wherein the optical modulating unit is disposed between the optical guiding unit and the first bearer or the second bearer which is configured to carry the lens.

13. The optical module as claimed in claim 11, wherein the first bearer further comprises another inclined plane, and the inclined planes are separately disposed on the peripheral edge of the first end surface of the first bearing portion;
wherein the second bearer further comprises another protruding portion, the protruding portions are spaced and correspond to the inclined planes, and each protruding portion extends from the second end surface of the second bearing portion and is configured to contact the corresponding inclined plane;
wherein when one of the protruding portions contacts the corresponding inclined plane, the inclined plane does not expose the protruding portion in the direction from the first bearing portion to the second bearing portion.

14. The optical module as claimed in claim 6, wherein when the protruding portion contacts the inclined plane, the first optical element and the second optical element constitutes an optical axis, after the optical axis is constituted, the first bearer and the second bearer are fixed to each other by putting glue between the first bearer and the second bearer.

15. The optical module as claimed in claim 1, wherein one of the first optical element and the second optical element is a light source, the other one of the first optical element and the second optical element is a lens, the light source is configured to emit a light beam, and the lens is configured to allow the light beam to pass through.

16. The optical module as claimed in claim 1, wherein the first bearer and the second bearer are fixed to each other by putting glue between the first bearer and the second bearer.

17. An optical module, comprising:
a first bearer comprising a first bearing portion and an inclined plane, wherein the first bearing portion is configured to carry a first optical element, and the inclined plane is disposed on a peripheral edge of a first end surface of the first bearing portion; and
a second bearer comprising a second bearing portion and a protruding portion, wherein the second bearing portion is configured to carry a second optical element, a second end surface of the second bearing portion faces the first end surface of the first bearing portion, and the protruding portion extends from the second end surface of the second bearing portion to the first bearing portion and is configured to contact the inclined plane;

wherein when the protruding portion contacts the inclined plane, the inclined plane does not expose the protruding portion in a direction from the first bearing portion to the second bearing portion;

wherein during assembly of the optical module, the protruding portion is placed against the inclined plane, and the first bearer and the second bearer are moved with respect to each other on a vertical plane;

wherein one of the first optical element and the second optical element is a light source, the other one of the first optical element and the second optical element is a lens, the light source is configured to emit a light beam, and the lens is configured to allow the light beam to pass through.

18. The optical module as claimed in claim 16, wherein after the distance between the first optical element and the second optical element is adjusted, no portion of the second bearer contacts the first bearer except the protruding portion.

19. A process for assembling an optical module, comprising:
fixing a first optical element to a first bearer wherein the first bearer comprises an inclined plane;
fixing a second optical element to a second bearer wherein the second bearer comprises a protruding portion;
providing a relative movement between the first bearer and the second bearer on a plane so that the first optical element and the second optical element are directed to each other;
providing another relative movement between the first bearer and the second bearer in a direction perpendicular to the plane until the protruding portion contacts the inclined surface, whereby the first optical element and the second optical element constitute an optical axis;
rotating the first bearer or the second bearer about the optical axis to adjust a distance between the first optical element and the second optical element.

* * * * *